UNITED STATES PATENT OFFICE.

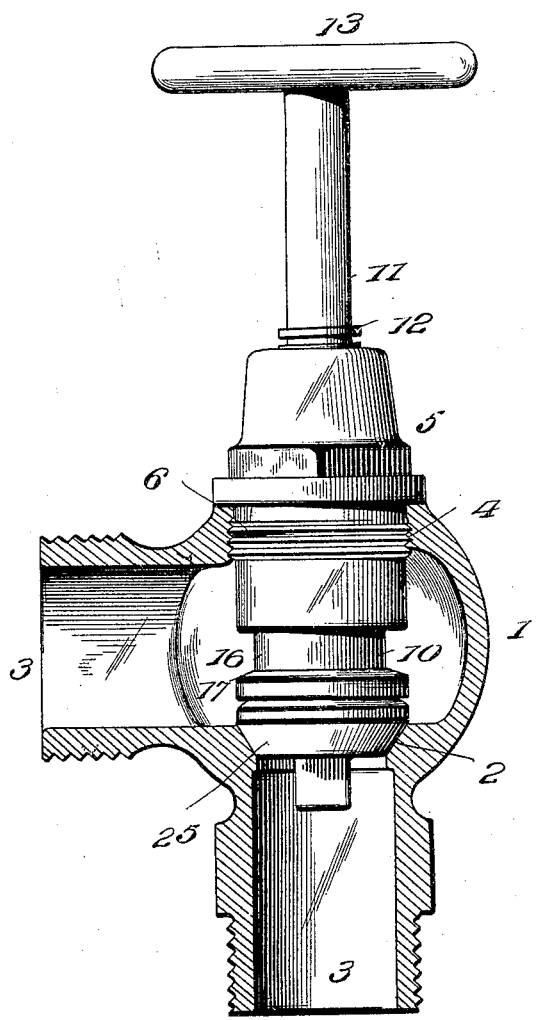
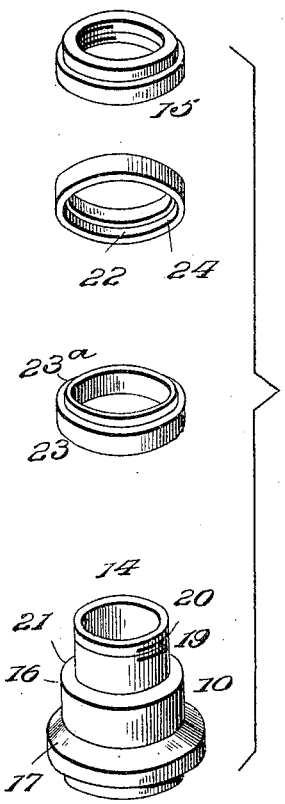
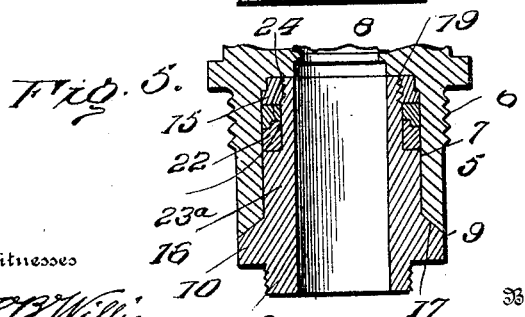

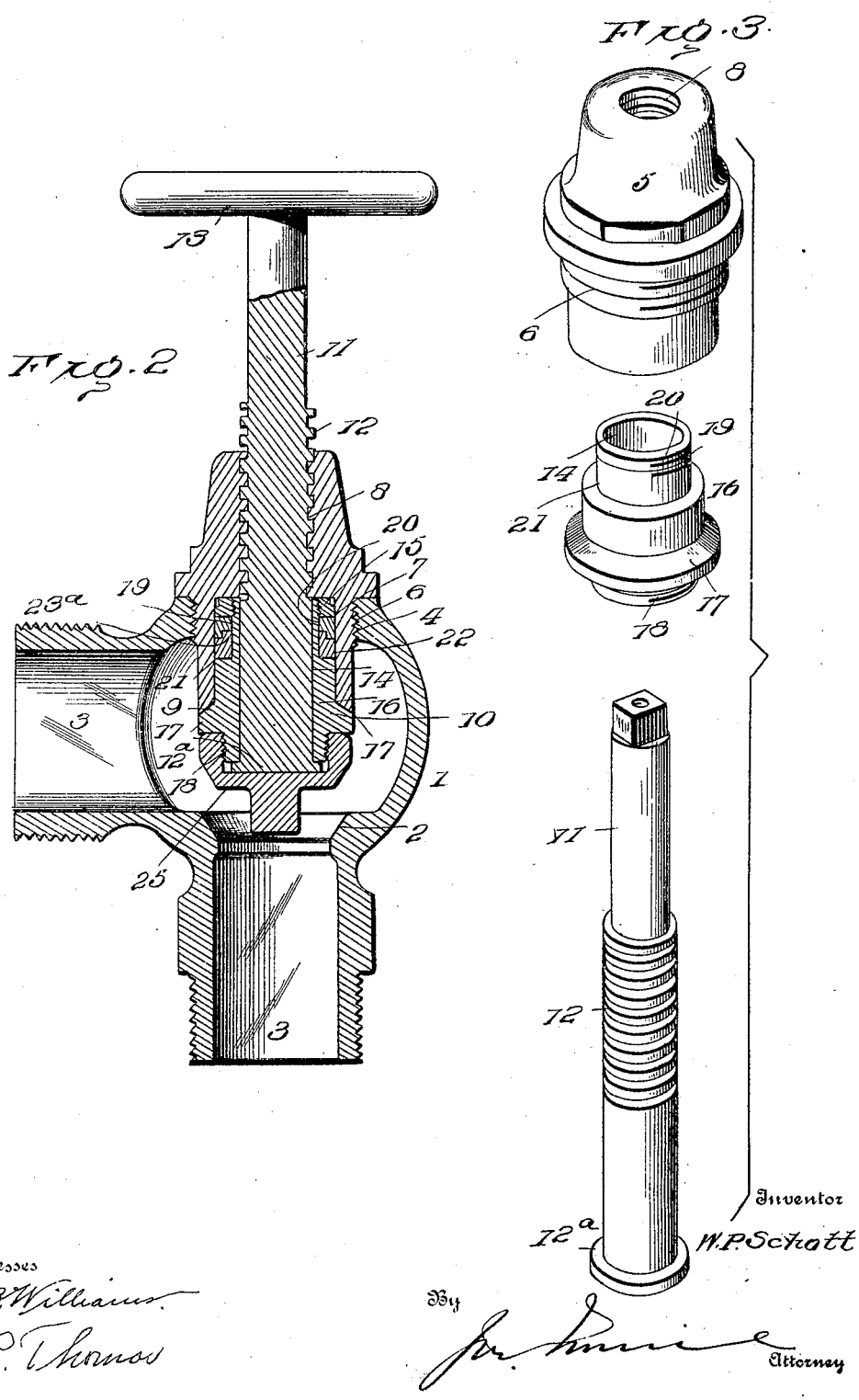

WILLIAM P. SCHOTT, OF FLINT, MICHIGAN.

VALVE.

No. 804,056. Specification of Letters Patent. Patented Nov. 7, 1905.

Application filed October 25, 1904. Serial No. 229,930.

*To all whom it may concern:*

Be it known that I, WILLIAM P. SCHOTT, a citizen of the United States, residing at Flint, in the county of Genesee and State of Michigan, have invented new and useful Improvements in Valves, of which the following is a specification.

This invention relates to improvements in reciprocating valves of the type wherein the packing medium is carried by and moved with the valve and its stem.

Considerable difficulty has heretofore been experienced by those using valves in maintaining the packing tight and preventing leakage around the stem. The primary cause of this leakage is due to the fact that the packing becomes dry and loses its value. I have found that by providing a suitable receptacle through which the valve-stem works and mounting on the stem an enlargement with packing-rings to fit nicely the receptacle and move with the valve I successfully overcome the leakage usually present where ordinarily stuffing-boxes are employed.

Therefore the object of this invention is to provide an enlargement detachably mounted on the valve-stem and carrying with it metal packing-rings to impinge the walls of its retaining-chamber to prevent leakage around the stem.

A further object of the invention is to provide a reciprocating valve-stem with a detachably-mounted packing enlargement on which the valve is mounted and which is prevented from turning with the valve-stem.

Other objects and advantages will be hereinafter referred to and be particularly pointed out in the claims.

In the drawings, Figure 1 is a side elevation of my improved valve, the casing being shown in section. Fig. 2 is a vertical section showing the valve open. Fig. 3 is a detail perspective view of the stem and its associated parts. Fig. 4 is a detail enlarged perspective view of the packing-rings and their holding means. Fig. 5 is an enlarged section of the packing-rings.

The same numerals refer to like parts in all the figures.

1 represents a globe-valve; 2, the seat therein; 3 3, the inlet and outlet openings, and 4 is a threaded opening in the top to receive the valve and stem and the packing means.

5 is a casting having outer threads 6 to engage the threads of the opening 4. The lower portion of the casting is hollow to form a packing-chamber 7, and communicating with the chamber is a threaded opening 8. The lower edge of the casting is beveled, as at 9, to form a seat for a packing-carrier 10. The valve-stem 11 is threaded at 12 and engages the threaded opening 8, and at its lower end said stem is provided with an annular flange $12^a$ and at its upper end with a hand-wheel 13.

The packing-carrier 10 is formed with an opening 14 and comprises two members 15 and 16. The lower member 16 has an annular flange 17, below which is a reduced threaded portion 18. For a short distance above the flange 17 the carrier is approximately the diameter of the chamber 7, and it is further reduced to form a neck 19, which is threaded at its upper end, as at 20. On the threaded end 20 is screwed the member 15. Between the member 15 and the shoulder 21 on member 16 are two split packing-rings 22 and 23, adjusted and fastened in place by the clamping member 15. The opening in the packing-carrier is large enough for the threaded stem to pass freely therethrough, and it is supported by the flanged end of the valve-stem. The packing-ring 23 is reduced to form a shoulder $23^a$, while the ring 22 is formed with an annular recess 24 to receive the shoulder $23^a$. This construction insures the two rings being fastened together and assists in preventing them turning on the carrier.

The valve 25 is of the usual shape and is hollow and internally threaded to engage the threads 18 on the bottom of the member 16, the hollow portion being deep enough to take the flange $12^a$.

To assemble the parts, the packing-rings are placed on the shoulder 21 and the member 15 screwed in place. The carrier 10 is then slipped on the stem 11 and rests on the flange 12. The casting is now slipped on the rod and the threads thereof engaged, drawing the packing-carrier up into the chamber, after which the valve is secured on the threaded lower end of the carrier. The casing is then screwed in the opening 4, after which the valve may be turned to its seat. It will be noticed that by this construction the valve and packing and its carrier are moved parallel with the valve-stem, due to the fact that the flange and stem turn freely in the hollow valve and carrier. Further, the valve is forced to its seat in a line parallel with the movement of its stem and is not subject to wear, as with valves now in use, which turn when the stem is to be seated. While it is true this condition exists, nevertheless the valve and the packing-carrier may be turned on the stem if by any reason the frictional contact of the packing-rings against the walls of the receptacle is overcome.

My invention overcomes the necessity of using loose packing in stuffing-boxes and insures the valve being ready for use, irrespective of the fact that the valve has been inoperative for some time.

When the valve is wide open, there is the greatest liability of steam escaping, and to meet this emergency I bevel the top of the flange to engage the bevel edge of the member 16. This acts in conjunction with the packing-rings to prevent steam passing into the receptacle.

The invention is capable of being applied to globe-valve casings now in use and may be positioned without removing said casing from its connections.

What I claim as new is—

1. A valve comprising a casing formed with an opening and a valve-seat, a hollow casting removably secured in said opening, the lower edge of the casting being beveled, a stem engaging a threaded opening formed in the casting, a flange formed on the lower end of the stem, a carrier loosely fitting the stem and seating on the flange thereof, said carrier fitting within the casting and reduced at its upper end to provide a packing-face, a packing seated in said space, means engaging the carrier to hold the packing in place, the carrier being provided with a beveled annular projection to engage the beveled wall of the casting and threaded on its lower end, and a valve engaging the threaded end of the carrier and bearing loosely against the flange on the valve-stem.

2. A valve comprising a casting to be removably secured in a valve-casing, a portion of said casting being hollow with its free edge beveled, a packing-carrier loosely seated within the hollow portion of the casting and having an annular beveled projection to engage the beveled edge of the casting, that portion of the carrier within the casting being reduced to provide a packing-recess, a valve proper removably secured on the lower end of the carrier, but spaced therefrom to provide an annular recess between the lower end of the carrier and the valve proper, and a valve-stem having threaded engagement with the casting and passed loosely through the carrier, the lower end of the stem being provided with an annular flange to seat loosely in the recess between the carrier and valve proper.

3. A valve comprising a casing formed with an opening and a valve-seat, a cap fitting in the opening and extending within the casing, the lower edge of the cap being beveled, a chamber formed in the cap which communicates with a threaded opening, a threaded stem fitting in the opening having at its lower end a flange, a carrier loosely mounted on the stem above the flange, said carrier being formed with a body portion of a diameter equal the diameter of the chamber, a reduced extension projecting from the body portion, a beveled head corresponding with the beveled edge of the chamber, and a reduced threaded extension projecting from the beveled head, a threaded valve engaging the threaded extension, a plurality of packing-rings on the extension projecting from the body portion of the carrier, and means for holding the packing-rings against the body portion.

In testimony whereof I affix my signature in presence of two subscribing witnesses.

WILLIAM P. SCHOTT.

Witnesses:
JNO. IMIRIE,
DEINZA MATTHEWS.